US012722409B2

(12) United States Patent
Murayama

(10) Patent No.: US 12,722,409 B2
(45) **Date of Patent: *Sep. 1, 2026**

(54) PRINTING CASSETTE

(71) Applicant: BROTHER KOGYO KABUSHIKI KAISHA, Nagoya (JP)

(72) Inventor: Kentaro Murayama, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 181 days.

This patent is subject to a terminal disclaimer.

(21) Appl. No.: 17/706,482

(22) Filed: Mar. 28, 2022

(65) Prior Publication Data

US 2022/0219471 A1 Jul. 14, 2022

Related U.S. Application Data

(63) Continuation of application No. PCT/JP2020/034865, filed on Sep. 15, 2020.

(30) Foreign Application Priority Data

Sep. 30, 2019 (JP) ................................ 2019-178430

(51) Int. Cl.
*B41J 32/00* (2006.01)

(52) U.S. Cl.
CPC .................................... *B41J 32/00* (2013.01)

(58) Field of Classification Search
None
See application file for complete search history.

(56) References Cited

U.S. PATENT DOCUMENTS 3,639,697 A * 2/1972 Koguma ............. G11B 15/615 242/338.1
3,672,603 A 6/1972 Swain
(Continued)

FOREIGN PATENT DOCUMENTS

CN 102092201 A 6/2011
CN 103273748 A 9/2013
(Continued)

OTHER PUBLICATIONS

Extended European Search Report for European Patent Application No. 20873007.7 dated Aug. 17, 2023.
(Continued)

*Primary Examiner* — Alejandro Valencia
(74) *Attorney, Agent, or Firm* — KENEALY VAIDYA LLP

(57) ABSTRACT

A printing cassette to be attached to and detached from a printing apparatus main body is provided. The printing apparatus main body includes a drive shaft rotatable around an axis. The printing cassette includes: a first tape; a spool around which the first tape is wound or is to be wound and rotatable around a rotational axis parallel to a first direction; a first engaging portion of the spool configured to transmit a driving force of a drive shaft to the spool; and an input gear disposed at a different position from the spool in the first direction and engageable with another gear. The first engaging portion and the input gear engage with the drive shaft at different positions in the first direction when the printing cassette is attached to the printing apparatus main body.

18 Claims, 12 Drawing Sheets

(56) References Cited

U.S. PATENT DOCUMENTS

| | | | |
|---|---|---|---|
| 3,804,227 | A | 4/1974 | Cappotto et al. |
| 3,823,808 | A | 7/1974 | Murata et al. |
| 3,948,382 | A | 4/1976 | Nesbitt et al. |
| 4,034,935 | A | 7/1977 | Plaza et al. |
| 4,252,450 | A | 2/1981 | Goodman et al. |
| 4,351,619 | A | 9/1982 | Duke et al. |
| 4,397,574 | A | 8/1983 | Wojdyla |
| 4,402,619 | A | 9/1983 | Paque et al. |
| 4,490,059 | A | 12/1984 | Daughters |
| 4,499,513 | A | 2/1985 | Umeda |
| 4,538,931 | A | 9/1985 | Nagashima |
| 4,565,128 | A | 1/1986 | Moriyama et al. |
| 4,598,780 | A | 7/1986 | Iwasaki et al. |
| 4,668,961 | A | 5/1987 | Hiramatsu |
| 4,832,514 | A | 5/1989 | Basile |
| 4,856,921 | A | 8/1989 | Hatakeyama |
| 5,099,378 | A | 3/1992 | Turgeon |
| 5,145,268 | A | 9/1992 | Cavallini |
| 5,193,919 | A | 3/1993 | Godo et al. |
| 5,325,114 | A | 6/1994 | Fogle et al. |
| 5,402,954 | A | 4/1995 | Skavnak et al. |
| 5,435,657 | A | 7/1995 | Pearce et al. |
| 5,439,303 | A | 8/1995 | Alday |
| 5,472,286 | A | 12/1995 | Uemura et al. |
| 5,619,244 | A | 4/1997 | Manna |
| 5,645,360 | A | 7/1997 | Iwane et al. |
| 5,917,532 | A | 6/1999 | Cornell et al. |
| 5,959,652 | A | 9/1999 | Privin |
| 6,132,120 | A | 10/2000 | Yamaguchi et al. |
| 6,485,206 | B1 | 11/2002 | Takahashi |
| 6,511,238 | B1 | 1/2003 | Glize |
| 11,932,011 | B2 * | 3/2024 | Ukai .......................... B41J 5/34 |
| 2007/0172286 | A1 | 7/2007 | Pomfret |
| 2008/0080922 | A1 | 4/2008 | Vandermeulen |
| 2008/0084494 | A1 | 4/2008 | Pomfret |
| 2010/0166475 | A1 | 7/2010 | Yamaguchi et al. |
| 2010/0166477 | A1 | 7/2010 | Yamaguchi et al. |
| 2010/0166478 | A1 | 7/2010 | Yamaguchi et al. |
| 2010/0166479 | A1 | 7/2010 | Yamaguchi et al. |
| 2010/0166480 | A1 | 7/2010 | Yamaguchi et al. |
| 2010/0247205 | A1 | 9/2010 | Yamaguchi et al. |
| 2010/0247206 | A1 | 9/2010 | Yamaguchi et al. |
| 2010/0254742 | A1 | 10/2010 | Yamaguchi et al. |
| 2015/0030353 | A1 * | 1/2015 | Wang ........................ F16D 3/06 464/169 |
| 2015/0343821 | A1 | 12/2015 | Sakano et al. |
| 2016/0271981 | A1 | 9/2016 | Sakano et al. |
| 2016/0368294 | A1 | 12/2016 | Sakano et al. |
| 2017/0106677 | A1 | 4/2017 | Sakano et al. |
| 2017/0217228 | A1 | 8/2017 | Sakano et al. |
| 2018/0244084 | A1 | 8/2018 | Sakano et al. |
| 2018/0244085 | A1 | 8/2018 | Sakano et al. |
| 2020/0298604 | A1 * | 9/2020 | Kosuge .................... B41J 33/14 |

FOREIGN PATENT DOCUMENTS

| | | | |
|---|---|---|---|
| CN | 106132717 | A | 11/2016 |
| EP | 0414544 | A2 | 2/1991 |
| GB | 2016411 | A | 9/1979 |
| JP | S50-36734 | B1 | 11/1975 |
| JP | S54-111914 | A | 9/1979 |
| JP | S58-141479 | A | 8/1983 |
| JP | S59-6460 | A | 1/1984 |
| JP | S59-95180 | A | 6/1984 |
| JP | S60-8072 | U | 1/1985 |
| JP | S60-9657 | U | 1/1985 |
| JP | S60-36255 | U | 3/1985 |
| JP | S60-46254 | U | 4/1985 |
| JP | S60-48456 | U | 4/1985 |
| JP | S60-188821 | A | 9/1985 |
| JP | S60-224571 | A | 11/1985 |
| JP | S61-154877 | A | 7/1986 |
| JP | S62-103179 | U | 5/1987 |
| JP | S63-156762 | U | 10/1988 |
| JP | H02-6173 | A | 1/1990 |
| JP | H02-9562 | U | 1/1990 |
| JP | H02-11379 | A | 1/1990 |
| JP | H02-11380 | A | 1/1990 |
| JP | H02-37568 | Y2 | 10/1990 |
| JP | H03-97181 | A | 4/1991 |
| JP | H03-284973 | A | 12/1991 |
| JP | H04-152176 | A | 5/1992 |
| JP | H05-41834 | U | 6/1993 |
| JP | H05-139006 | A | 6/1993 |
| JP | H05-53956 | A | 7/1993 |
| JP | H5-82564 | U | 11/1993 |
| JP | H07-9745 | A | 1/1995 |
| JP | H07-32710 | A | 2/1995 |
| JP | H7-26144 | U | 5/1995 |
| JP | H07-276755 | A | 10/1995 |
| JP | H07-276757 | A | 10/1995 |
| JP | H08-183204 | A | 7/1996 |
| JP | H08-183232 | A | 7/1996 |
| JP | H08183230 | A | 7/1996 |
| JP | H10226109 | A | 8/1998 |
| JP | 2000-6504 | A | 1/2000 |
| JP | 2000-103149 | A | 4/2000 |
| JP | 2001-47713 | A | 2/2001 |
| JP | 2002-211092 | A | 7/2002 |
| JP | 2005-225060 | A | 8/2005 |
| JP | 2006-56263 | A | 3/2006 |
| JP | 2007-502221 | A | 2/2007 |
| JP | 2008-261968 | A | 10/2008 |
| JP | 2009-196804 | A | 9/2009 |
| JP | 2010221563 | A | 10/2010 |
| JP | 2011-46142 | A | 3/2011 |
| JP | 2011-148167 | A | 8/2011 |
| JP | 2011-150007 | A | 8/2011 |
| JP | 2012135931 | A | 7/2012 |
| JP | 2012-158175 | A | 8/2012 |
| JP | 2012-236307 | A | 12/2012 |
| JP | 2014-170142 | A | 9/2014 |
| JP | 2015-182318 | A | 10/2015 |
| WO | 2005/018944 | A1 | 3/2005 |

OTHER PUBLICATIONS

International Search Report for PCT/JP2020/034865 dated Nov. 17, 2020.

International Preliminary Report On Patentability dated Apr. 5, 2022 and Written Opinion of the International Search Report for PCT/JP2020/034865 dated Nov. 17, 2020.

Chinese Office Action for the related Chinese Patent Application No. 202080068255.5 dated Feb. 4, 2024.

Japanese Office Action for the corresponding Japanese patent application No. 2023-121494 dated Jul. 23, 2024.

* cited by examiner

PRINTING CASSETTE

CROSS-REFERENCE TO RELATED APPLICATIONS

This is a continuation application of International Application No. PCT/JP2020/034865 filed on Sep. 15, 2020 which claims priority from Japanese Patent Application No. 2019-178430 filed on Sep. 30, 2019. The entire contents of the earlier applications are incorporated herein by reference.

TECHNICAL FIELD

The present disclosure relates to a printing cassette.

BACKGROUND

In a known device that prints on tape, the tape is exchanged and supplied by attaching and detaching a cassette containing the tape to and from the main body.

SUMMARY

The above-mentioned cassette winds the tape by rotating the take-up spool. The take-up spool rotates by being transmitted transmitting a driving force from the main body of a printing apparatus by a drive shaft. Further, in the above-mentioned cassette, for example, a gear for transmitting a driving force for transporting a tape may be required inside the cassette. Transmitting the driving force from the main body of the printing apparatus to this gear by the drive shaft may also be necessary.

Therefore, both a space for inserting the drive shaft for driving the take-up spool and a space for inserting the drive shaft for driving the gear are required inside the cassette. As a result, the size of the cassette increases in the direction orthogonal to the axial direction (that is, the insertion direction) of these drive shafts.

One aspect of the present disclosure is to provide a printing cassette capable of inputting a driving force from a drive shaft to both an internal spool and a gear while suppressing an increase in size.

One aspect of the present disclosure is a printing cassette that is to be attached to and detached from a printing apparatus main body. The printing apparatus main body includes a drive shaft configured to rotate around an axis. The printing cassette includes: a first tape; a spool around which the first tape is wound or is to be wound and configured to rotate around a rotational axis parallel to a first direction; a first engaging portion included in the spool and configured to transmit a driving force of a drive shaft to the spool; and an input gear that is disposed at a different position from the spool in the first direction and configured to engage with another gear to transmit the driving force of the drive shaft to the other gear. The first engaging portion and the input gear engage with the drive shaft at different positions with each other in the first direction in a state where the printing cassette is attached to the printing apparatus main body.

While mounted on the printing apparatus main body, the first engaging portion and the input gear engage with the drive shaft at different positions in the first direction.

Another aspect of the present disclosure is a printing cassette. The printing cassette includes: a first tape; a spool around which the first tape is wound or is to be wound, having a cylindrical shape in which a hollow portion is defined by an inner peripheral surface, and configured to rotate around a rotational axis parallel to a first direction; a spool-side spline tooth protruding toward the hollow portion from the inner peripheral surface and configured to receive a driving force from an outside; an input gear that is disposed at a different position from the spool in the first direction and is engaged with another gear; and an engaging portion included in the input gear and configured to receive the driving force from the outside.

The spool is rotatable around an rotational axis parallel to the first direction, and the first tape is wound or is to be wound therearound. At least a portion of the engaging portion overlaps with the hollow portion in the first direction.

According to these configurations, the driving force can be transmitted from one drive shaft to the spool and the input gear at different positions in the axial direction of the rotation axis of the spool (that is, the insertion direction of the drive shaft). Therefore, the driving force can be input to both the spool and the input gear while suppressing the increase in the size of the printing cassette in the direction orthogonal to the insertion direction of the drive shaft.

Another aspect of the present disclosure is a printing cassette. The printing cassette includes: a first tape; a spool around which the first tape is wound or is to be wound, having a cylindrical shape in which a hollow portion is defined by an inner peripheral surface, and configured to rotate around a rotational axis parallel to a first direction; a spool-side spline tooth protruding toward the hollow portion from the inner peripheral surface and configured to receive a driving force from an outside; an input portion that is disposed at a different position from the spool in the first direction and is engaged with another driving force transmitting portion; and an engaging portion included in the input portion and configured to receive the driving force from the outside. At least a portion of the engaging portion overlaps with the hollow portion in the first direction.

DETAILED DESCRIPTION

1. First Embodiment

[1-1. Configuration]

Figure 1A:
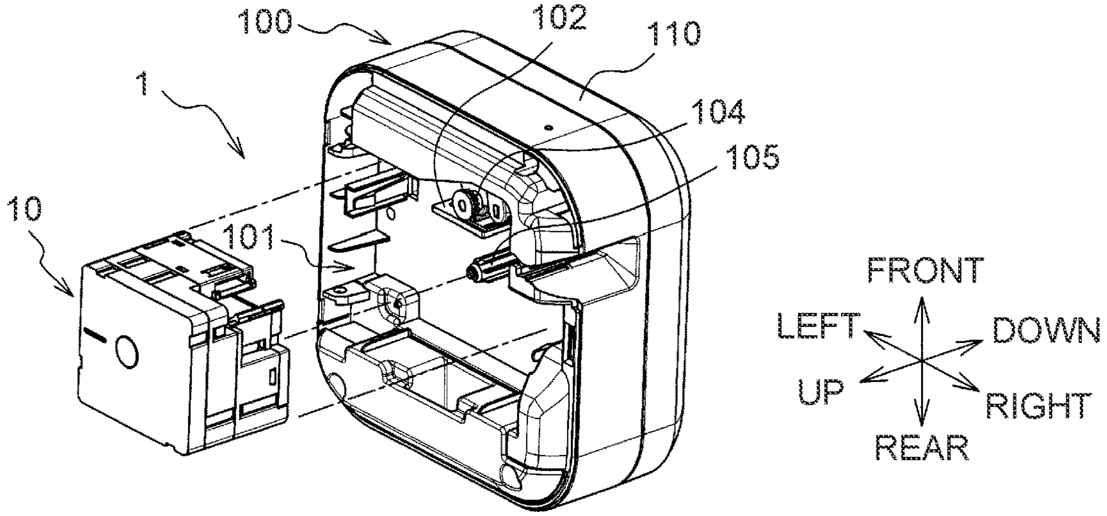
FIGS. 1A, 1B, and 1C are schematic perspective views showing a state in which the printing cassette is removed from the printing apparatus main body in the printing apparatus according to the embodiment.
Figure 1B:
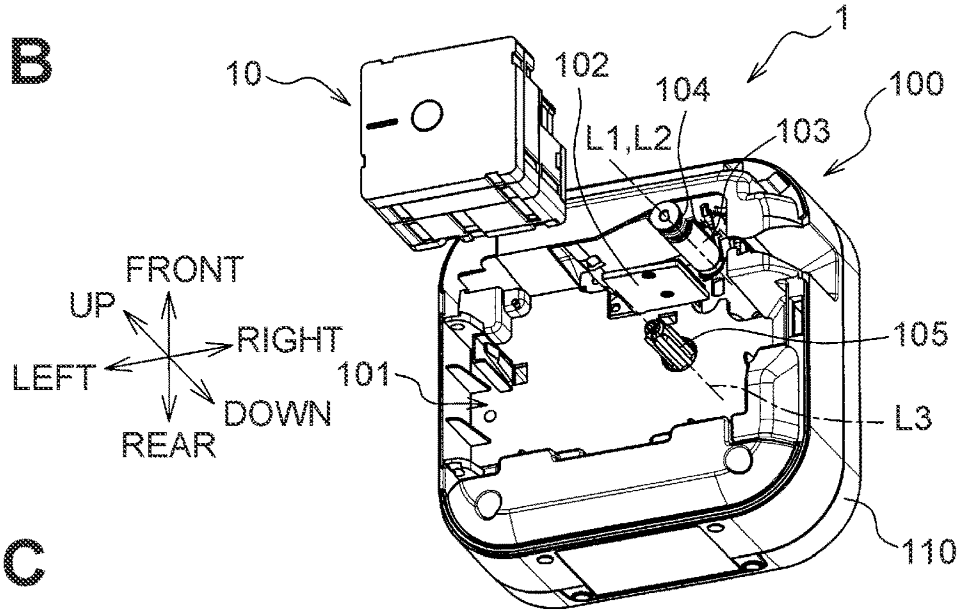
Figure 1C:
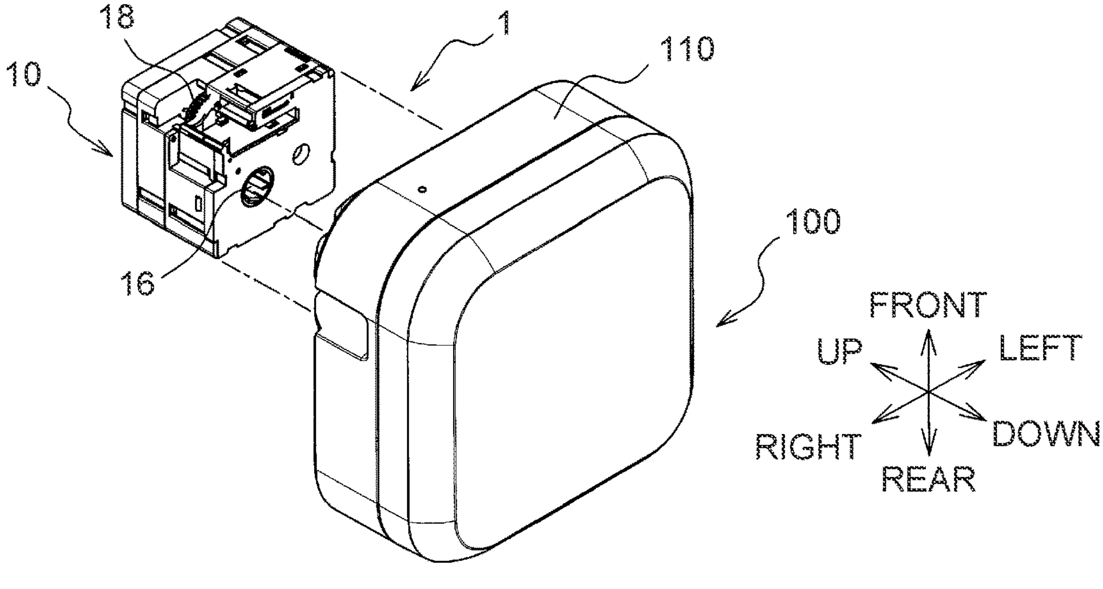

A printing apparatus I shown in FIGS. 1A, 1B, 1C includes a printing cassette 10 and a printing apparatus main body 100. The printing apparatus 1 is an apparatus that prints on a tape-shaped printing medium.

In the present embodiment, each of an axial direction of an output gear 18 of the printing cassette 10 and an axial direction of a platen gear 104 of the printing apparatus main body 100 is an up-down direction. A direction orthogonal to the up-down direction in which the output gear 18 and an input spool 16 are arranged (that is, the platen gear 104 and the drive shaft 105 are arranged) is a front-rear direction. A direction orthogonal to both of the up-down direction and the front-rear direction is a left-right direction.

(Printing Apparatus Main Body)

The printing apparatus main body 100 includes a cassette insertion unit 101, a print head 102, a platen roller 103, a platen gear 104, a drive shaft 105, and a housing 110.

(Cassette Insertion Unit)

The cassette insertion unit 101 is a concave portion in which the printing cassette 10 is to be attached. The cassette insertion unit 101 has a positioning function for the printing cassette 10. The cassette insertion unit 101 is provided in the housing 110.

(Print Head)

The print head 102 is disposed inside the cassette insertion unit 101. The print head 102 has a plurality of heat generating elements at which heat generation is individually controlled.

(Platen Roller)

A rotational axis L1 of a platen roller 103 is parallel to the up-down direction. The platen roller 103 is disposed adjacent to the print head 102 inside the cassette insertion unit 101. The platen roller 103 can swing in a direction toward or away from the print head 102.

(Platen Gear)

The platen gear 104 is connected to the platen roller 103. In the present embodiment, a rotational axis L2 of the platen gear 104 is disposed on the same line as the rotational axis L1 of the platen roller 103. The platen gear 104 can swing together with the platen roller 103.

(Drive Shaft)

A drive shaft 105 is inserted into an input spool 16. The drive shaft 105 rotates the input spool 16.

The drive shaft 105 is disposed inside the cassette insertion unit 101. A rotational axis L3 of the drive shaft 105 is parallel to the up-down direction. The drive shaft 105 rotates about the rotational axis L3 by a drive source (for example, a motor) (not shown in figures).

(Printing Cassette)

The printing cassette 10 stores a printing medium. The printing cassette 10 is removable from the printing apparatus main body 100. By exchanging the printing cassette 10, the printing medium can be replenished and the type (for example, color, material, etc.) of the printing medium can be changed.

Figure 2A:
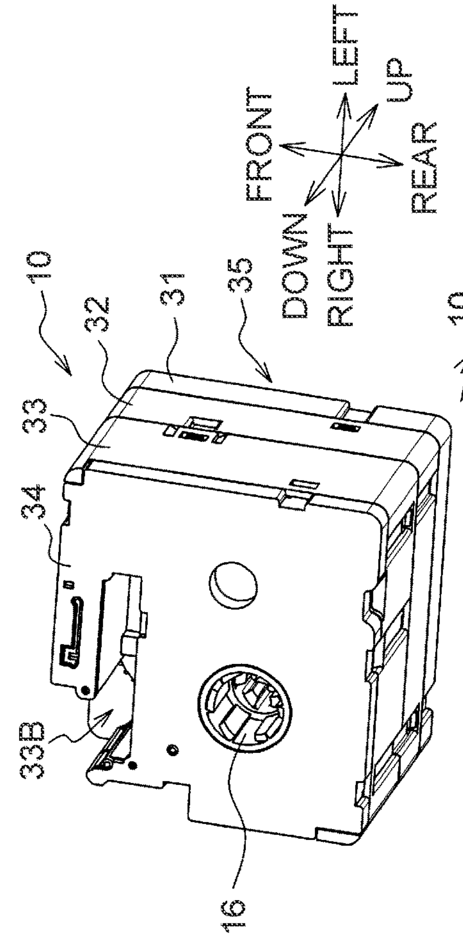
FIGS. 2A, 2B and 2C are schematic perspective views of a printing cassette in the printing apparatus of FIG. 1A.
Figure 2C:
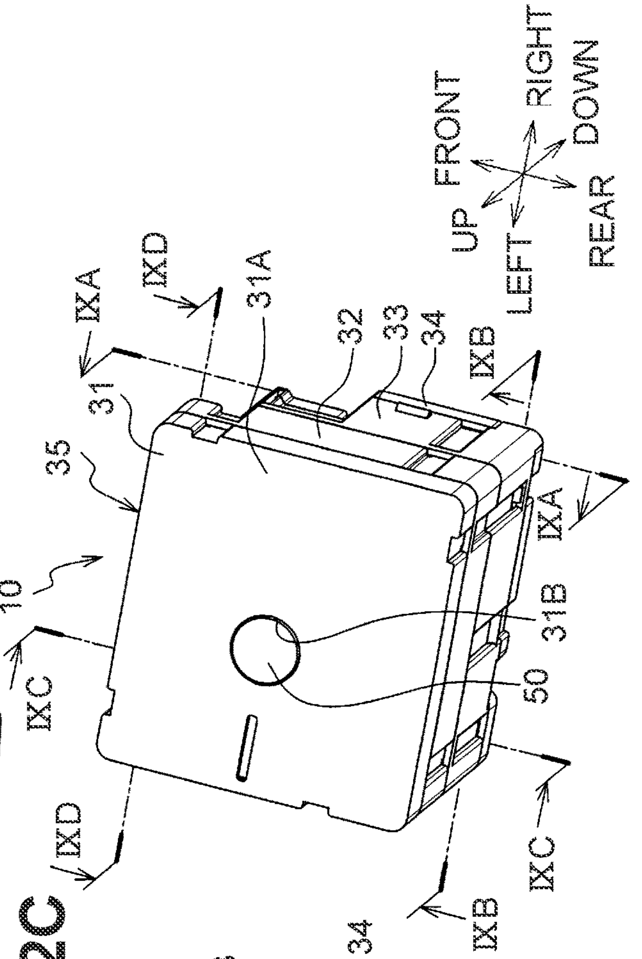
Figure 2B:
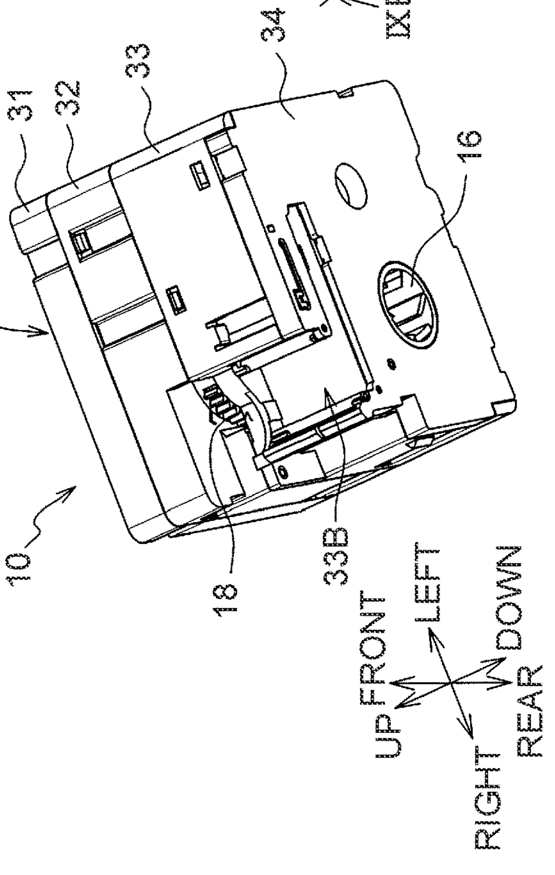

As shown in FIGS. 2A, 2B, and 2C, the priming cassette 10 includes a case 35 for storing such as a printing tape 11A, an ink ribbon 14A (an example of the first tape). The outer shape of the printing cassette 10 (that is, the shape of the case 35) is a rectangular body having sides parallel to the up-down direction, sides parallel to the front-rear direction, and sides parallel to the left-right direction. The case 35 has a first case portion 31, a first frame portion 32, a second frame portion 33, and a second case portion 34.

Figure 3:
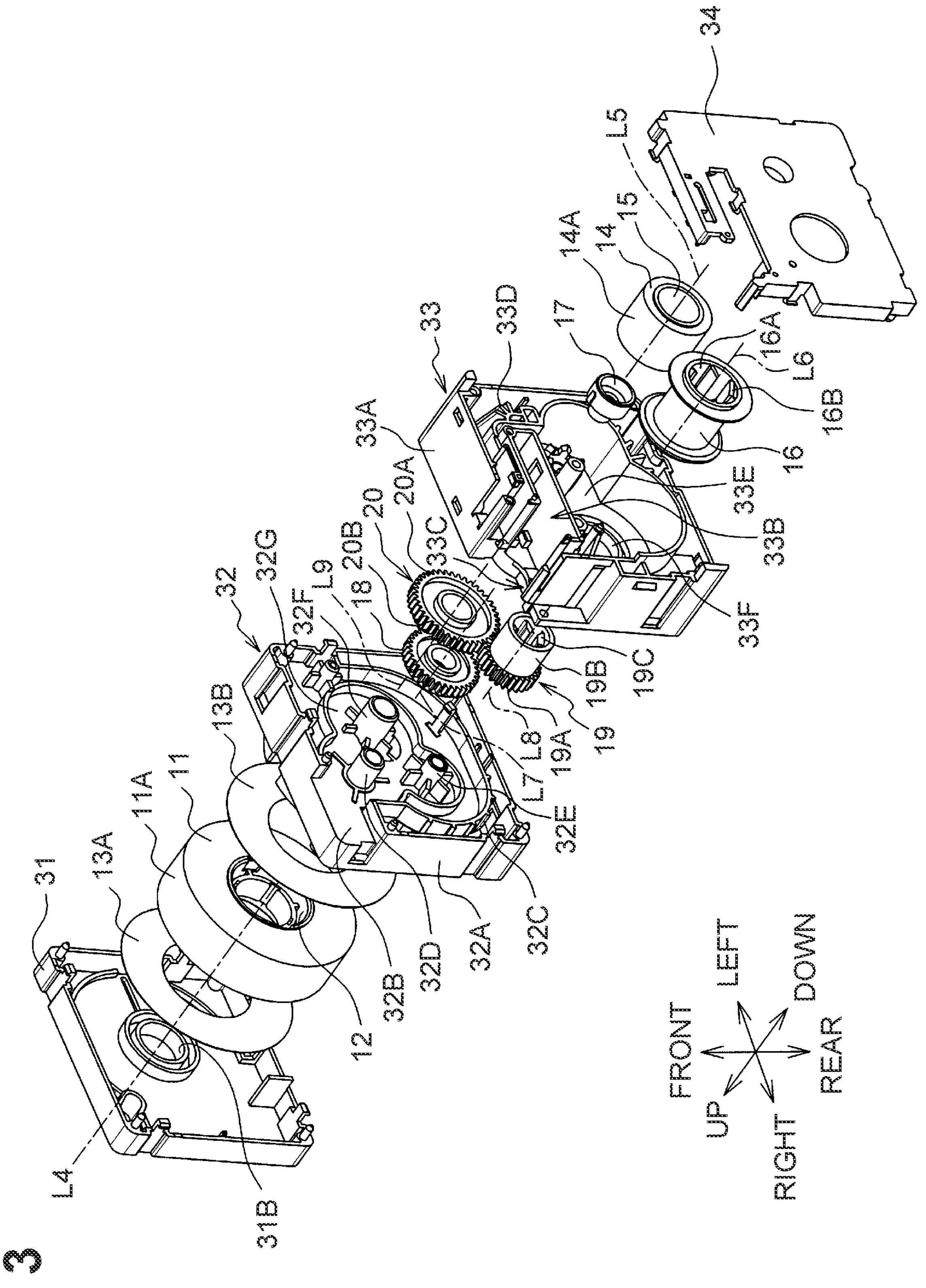
FIG. 3 is a schematic exploded perspective view of the printing cassette of FIG. 2A.

As shown in FIG. 3, the printing cassette 10 includes a printing tape roll 11, a first supply spool 12, spacer films 13A and 13B, an ink ribbon roll 14, a second supply spool 15, and an input spool 16, a spool-side spline tooth 16B (an example of a first engaging portion), a clutch spring holder 17, an output gear 18, an input gear 19, and an idle gear 20.

(Printing Tape Roll)

The printing tape roll 11 is a printing tape 11A on which printing is performed. The printing tape roll 11 is wound around a first supply spool 12.

The printing tape roll 11 has a cylindrical shape in which the printing tape 11A is wound around a winding center axis parallel to the up-down direction, and a hollow portion is defined by an inner peripheral surface of the wound printing tape 11A.

The printing tape roll 11 is provided with a first supply spool 12 in a hollow portion defined by the printing tape 11A. Printing is performed on a surface of the printing tape 11A by the print head 102 of the printing apparatus main body 100 and the ink ribbon 14A.

Two spacer films 13A and 13B are arranged on the outside of the printing tape roll 11 in the up-down direction so as to sandwich the priming tape roll 11. The spacer films 13A and 13B are arranged between the printing tape roll 11 and the first case portion 31 and between the printing tape roll 11 and the first frame portion 32.

(First Supply Spool)

The first supply spool 12 is rotatable around a rotational axis L4. The first supply spool 12 rotates with the transfer of the printing tape 11A by the platen roller 103 of the printing apparatus main body 100 to supply the printing tape 11A to the print head 102.

(Ink Ribbon Roll)

The ink ribbon roll 14 is obtained by winding the ink ribbon 14A used for printing the printing tape 11A around the second supply spool 15.

The ink ribbon 14A is overlapped with the printing tape 11A at the head opening 33B and is used for printing by the print head 102. The ink ribbon 14A used for printing is wound around the input spool 16.

Rotational resistance is applied to the ink ribbon roll 14 by the clutch spring held by the clutch spring holder 17. At least a part of the ink ribbon roll 14 is disposed at a position overlapping with the printing tape roll 11 in the up-down direction.

(Second Supply Spool)

The second supply spool 15 is rotatable around a rotational axis L5. The rotational axis L5 of the second supply spool 15 is parallel to the rotational axis L4 of the first supply spool 12, that is, parallel to the up-down direction.

The second supply spool 15 supplies the ink ribbon 14A to the print head 102 by rotating along with the winding of the ink ribbon 14A by the input spool 16.

(Input Spool)

The input spool 16 can rotate around a rotational axis L6. The rotational axis L6 of the input spool 16 is parallel to the rotational axis L5 of the second supply spool 15.

The input spool 16 has a cylindrical shape in which a hollow portion is defined by the inner peripheral surface 16A. The input spool 16 is a take-up spool that winds up the ink ribbon 14A. That is, the input spool 16 forms a take-up roll 14B by winding the ink ribbon 14A supplied from the ink ribbon roll 14. The input spool 16 is rotated by the drive shaft 105 via a spool-side spline teeth 16B.

In the take-up roll 14B, the ink ribbon 14A is wound around the input spool 16 about a winding center axis parallel to the up-down direction. The take-up roll 14B has a cylindrical shape in which a hollow portion is defined by an inner peripheral surface.

(Spool-Side Spline Tooth)

The spool-side spline tooth 16B is provided on the inner peripheral surface 16A of the input spool 16. The spool-side spline tooth 16B transmits the driving force of the drive shaft 105 of the printing apparatus main body 100 to the input spool 16.

The spool-side spline tooth 16B protrudes from the inner peripheral surface 16A of the input spool 16 toward the hollow portion of the input spool 16. In a state where the printing cassette 10 is attached to the printing apparatus main body 100, the drive shaft 105 is inserted into the hollow portion of the input spool 16 (that is, the take-up roll 14B), and the spool-side spline tooth 16B is engaged with the drive shaft 105. Accordingly, the driving force is input from the drive shaft 105 to the spool-side spline tooth 16B.

(Output Gear)

The output gear 18 is a single gear that outputs a driving force for conveying the printing tape 11A to the outside.

Specifically, the output gear 18 outputs a driving force to the platen gear 104 of the printing apparatus main body 100. A rotational axis L7 of the output gear 18 is parallel to the rotational axis L5 of the second supply spool 15. The output gear 18 overlaps with the cover portion 32B in the up-down direction.

The output gear 18 is partially exposed to the head opening 33B. The output gear 18 engages with the platen gear 104 at the head opening 33B in a state where the printing cassette 10 is attached to the printing apparatus main body 100.

The second supply spool 15, the output gear 18, and the printing tape roll 11 are arranged in the up-down direction in the order of the second supply spool 15, the output gear 18, and the printing tape roll 11. That is, the output gear 18 is located between the second supply spool 15 and the printing tape roll 11 in the up-down direction.

(Input Gear)

The input gear 19 indirectly engages with the output gear 18 via the idle gear 20 and transmits the driving force of the drive shaft 105 to the output gear 18.

The input gear 19 has a gear body 19A, a wall portion 19B, and a gear-side spline tooth 19C (an example of a second engaging portion). The gear body 19A is a single gear that engages with the idle gear 20.

The wall portion 19B is a cylindrical spool that extends downward from a surface orthogonal to the rotational axis of the gear body 19A and has a hollow portion defined by an inner peripheral surface. The wall portion 19B is arranged radially inside the input gear 19 with respect to the pitch circle of the input gear 19.

The gear-side spline tooth 19C is provided on the inner peripheral surface of the wall portion 19B. That is, the gear-side spline tooth 19C is arranged radially inside the pitch circle of the input gear 19. The gear-side spline tooth 19C protrudes toward the rotational axis L8 of the input gear 19.

The gear-side spline tooth 19C engages with the drive shaft 105 in a state where the printing cassette 10 is attached to the printing apparatus main body 100. Accordingly, the driving force is input from the drive shaft 105 to the gear-side spline tooth 19C. The gear body 19A rotates integrally with the wall portion 19B by the driving force input to the gear-side spline tooth 19C.

The rotational axis L8 of the input gear 19 (that is, the rotational axis of the gear body 19A and the rotational axis of the wall portion 19B) overlaps the hollow portion of the input spool 16 (that is, the take-up roll 14B) in the up-down direction. Further, the input gear 19 is arranged so that the rotational axis L8 of the input gear 19 is on the same line as the rotational axis L6 of the input spool 16. Further, the gear body 19A of the input gear 19 is arranged at a position different from each position of the input spool 16 and the take-up roll 14B in the up-down direction.

Specifically, the input spool 16, a part of the input gear 19 (that is, the gear body 19A), and the printing tape roll 11 are arranged in the up-down direction in the order of the part of the input spool 16 (that is, the gear body 19A), the input gear 19, and the printing tape roll 11.

Figure 4:
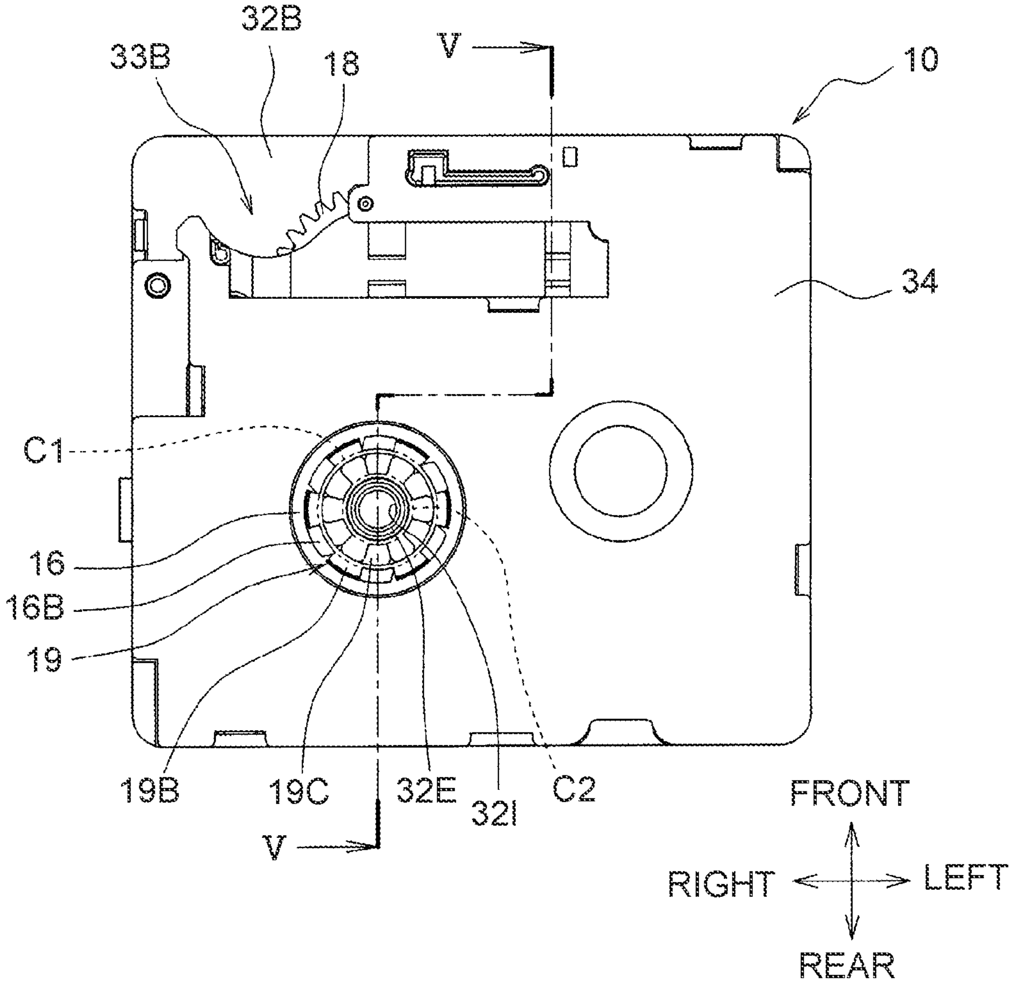
FIG. 4 is a schematic bottom view of the printing cassette of FIG. 2A.

As shown in FIG. 4, in a projection drawing in which the input spool 16 and the input gear 19 are projected onto a surface virtually orthogonal to the up-down direction (that is, the printing cassette 10 is viewed from below), a diameter of an inscribed circle C1 of the spool-side spline tooth 16B is more than a diameter of an inscribed circle C2 of the gear-side spline tooth 19C. Further, at least a part of the gear-side spline tooth 19C overlaps with the hollow portion of the input spool 16 in the up-down direction.

Figure 5:
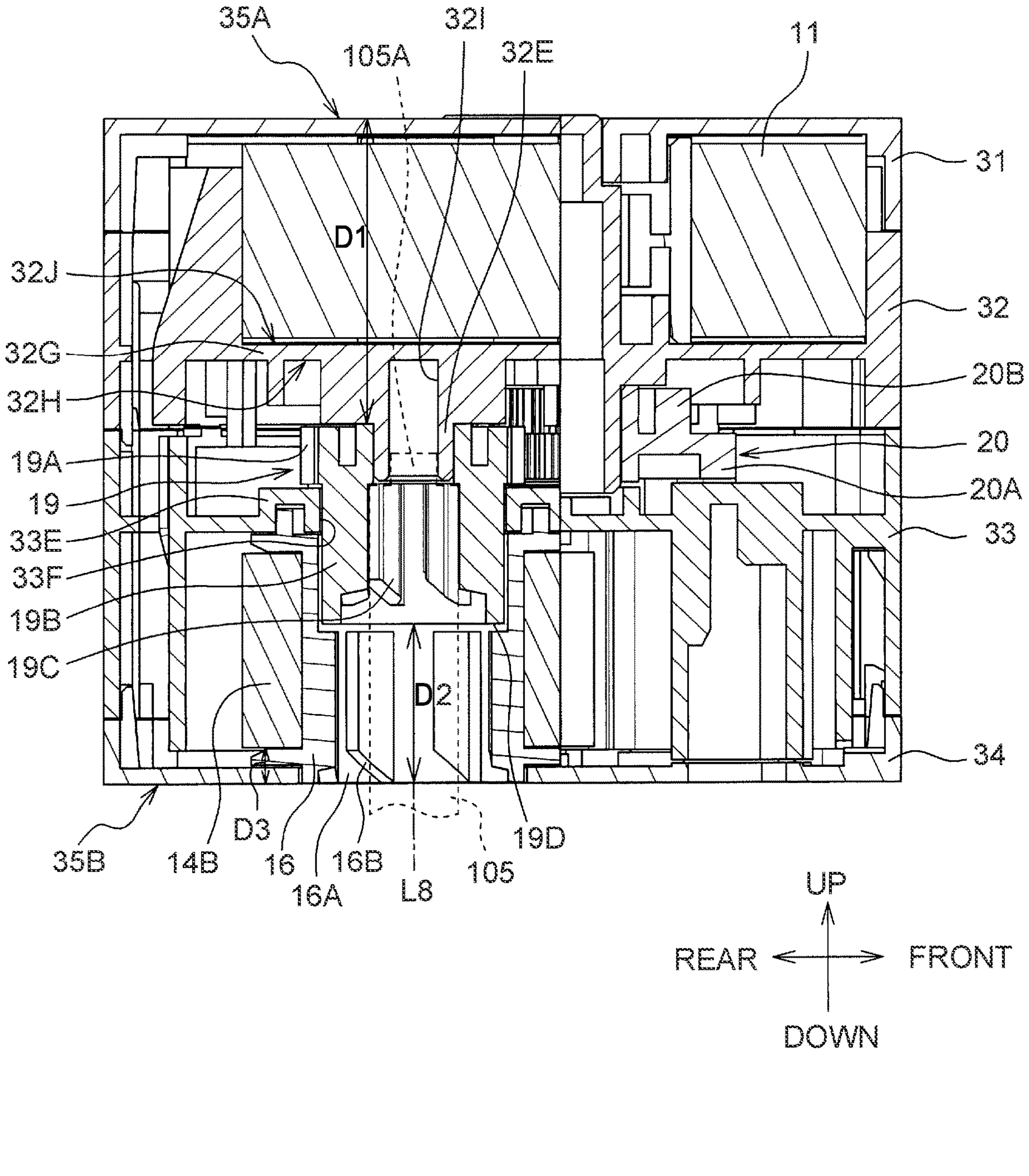
FIG. 5 is a schematic cross-sectional view taken along the line V-V of FIG. 4.

As shown in FIG. 5, the wall portion 19B is inserted into the hollow portion of the input spool 16 (that is, the take-up roll 14B). Specifically, a lower end portion of the wall portion 19B is inserted into the input spool 16 up to a position where it does not overlap with the spool-side spline tooth 16B in a radial direction of the input spool 16.

Since a rotational axis L8 of the input gear 19 overlaps with the hollow portion of the input spool 16 in the up-down direction, the drive shaft 105 is simultaneously inserted into the input spool 16 (that is, the take-up roll 14B) and the input gear 19.

In a state where the printing cassette 10 is attached to the printing apparatus main body 100, the spool-side spline tooth 16B and the input gear 19 (that is, the gear-side spline tooth 19C) are engaged with the drive shaft 105 at different positions in the up-down direction. Accordingly, the input gear 19 is not directly connected to the input spool 16, but is rotated by a drive source (that is, a drive shaft 105) common to the input spool 16.

(Idle Gear)

The idle gear 20 engages with the input gear 19 and the output gear 18. The idle gear 20 transmits, to the output gear 18, the driving force input to the input gear 19. A rotational axis L9 of the idle gear 20 is parallel to the up-down direction.

The idle gear 20 is a stage gear in which a large gear 20A engaged with the input gear 19 and a small gear 20B engaged with the output gear 18 are arranged coaxially. The small gear 20B has a smaller diameter than the large gear 20A.

Further, the small gear 20B is disposed at a position closer to (that is, above) the printing tape roll 11 than the large gear 20A in the up-down direction. The idle gear 20 constitutes a deceleration mechanism that reduces a rotational speed of the driving force input to the input gear 19.

(Case)

As shown in FIG. 3, the first case portion 31 constitutes the upper end portion of the printing cassette 10. The first frame portion 32 is disposed below the first case portion 31 and is vertically connected to the first case portion 31. The second frame portion 33 is disposed below the first frame portion 32 and is vertically connected to the first frame portion 32. The second case portion 34 constitutes a lower end portion of the printing cassette 10. The second case portion 34 is vertically connected to the second frame portion 33.

The first case portion 31 and the first frame portion 32 accommodate the printing tape roll 11. That is, the printing tape roll 11 is disposed in a space surrounded by the first case portion 31 and the first frame portion 32.

The second case portion 34 and the second frame portion 33 accommodate the ink ribbon roll 14, the second supply spool 15, and the input spool 16. That is, the ink ribbon roll 14, the second supply spool 15, and the input spool 16 are disposed in a space surrounded by the second case portion 34 and the second frame portion 33.

A part of the output gear 18, the input gear 19, and the idle gear 20 are disposed in a space surrounded by the first frame portion 32 and the second frame portion 33.

Figure 6A:
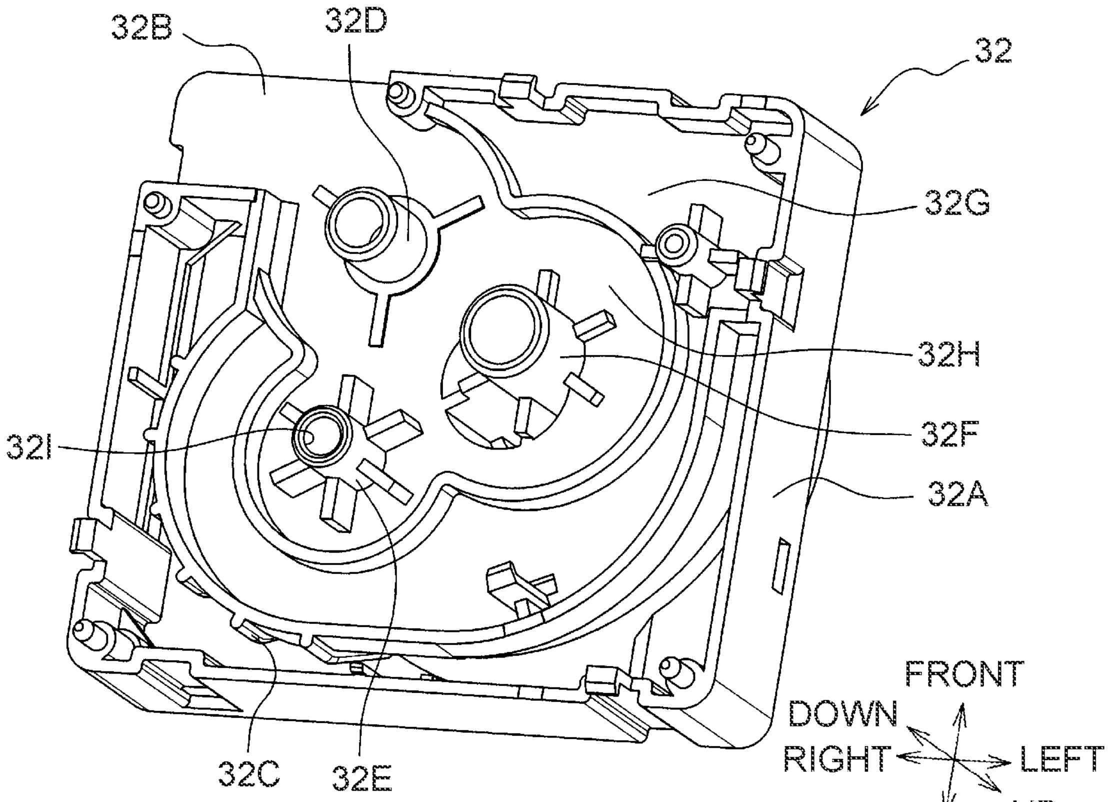
FIG. 6A is a schematic perspective view of the first frame portion in the printing cassette of FIG. 2A.

As shown in FIG. 6A, the first frame portion 32 has a first side wall 32A, a cover portion 32B, a first guide 32C, and a second isolation wall 32G. The first side wall 32A constitutes a side surface parallel to the up-down direction of the printing cassette 10.

The cover portion 32B is a portion having a surface orthogonal to the up-down direction. The cover portion 32B is disposed at a position where the cover portion 32B overlaps with the output gear 18 in the up-down direction. In the present embodiment, the cover portion 32B is disposed at the right front corner portion of the first frame portion 32.

The second isolation wall 32G is disposed on the side opposite to the input spool 16 (that is, above the input gear 19) with respect to the input gear 19 in the up-down direction. The second isolation wall 32G isolates the input gear 19 and the printing tape roll 11 in the up-down direction.

The second isolation wall 32G has a first gear shaft 32D, a second gear shaft 32E, a third gear shaft 32F, a gear facing surface 32H, and a support surface 32J (see FIG. 5).

The first gear shaft 32D is inserted into the output gear 18 and rotatably supports the output gear 18. The second gear shaft 32E is inserted into the input gear 19 and rotatably supports the input gear 19. The third gear shaft 32F is inserted into the idle gear 20 and rotatably supports the idle gear 20.

A gear facing surface 3211 is a surface extending orthogonal to the up-down direction and is disposed above the output gear 18, the input gear 19, and the idle gear 20. Each of the first gear shaft 32D, the second gear shaft 32E, and the third gear shaft 32F protrudes downward from the gear facing surface 32H.

A support surface 32J is disposed on the side opposite to the gear facing surface 32H in the up-down direction, and supports the printing tape roll 11 from the side of the input gear 19 (that is, from below).

Figure 7:
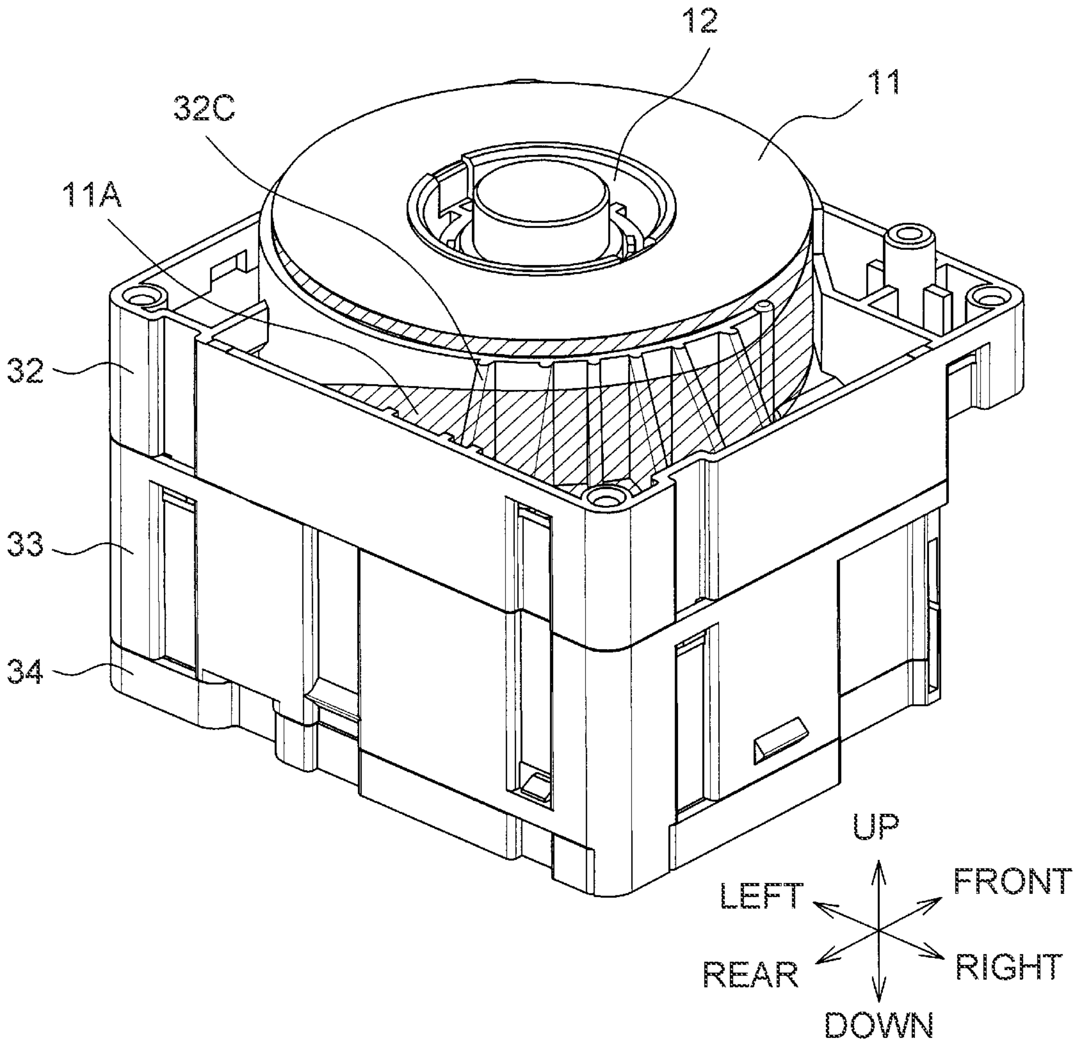
FIG. 7 is a schematic perspective view showing a state in which the first case portion of the printing cassette of FIG. 2C is removed.

As shown in FIG. 7, a first guide 32C is a portion around which the printing tape 11A drawn from the printing tape roll 11 is wound. The first guide 32C has a plurality of plate-shaped ribs arranged separately along the circumferential direction of the printing tape roll 11. The plurality of ribs protrude in the radial direction of the printing tape roll 11, and the amount of protrusion (that is, a plate width) increases toward the lower side.

Figure 6B:
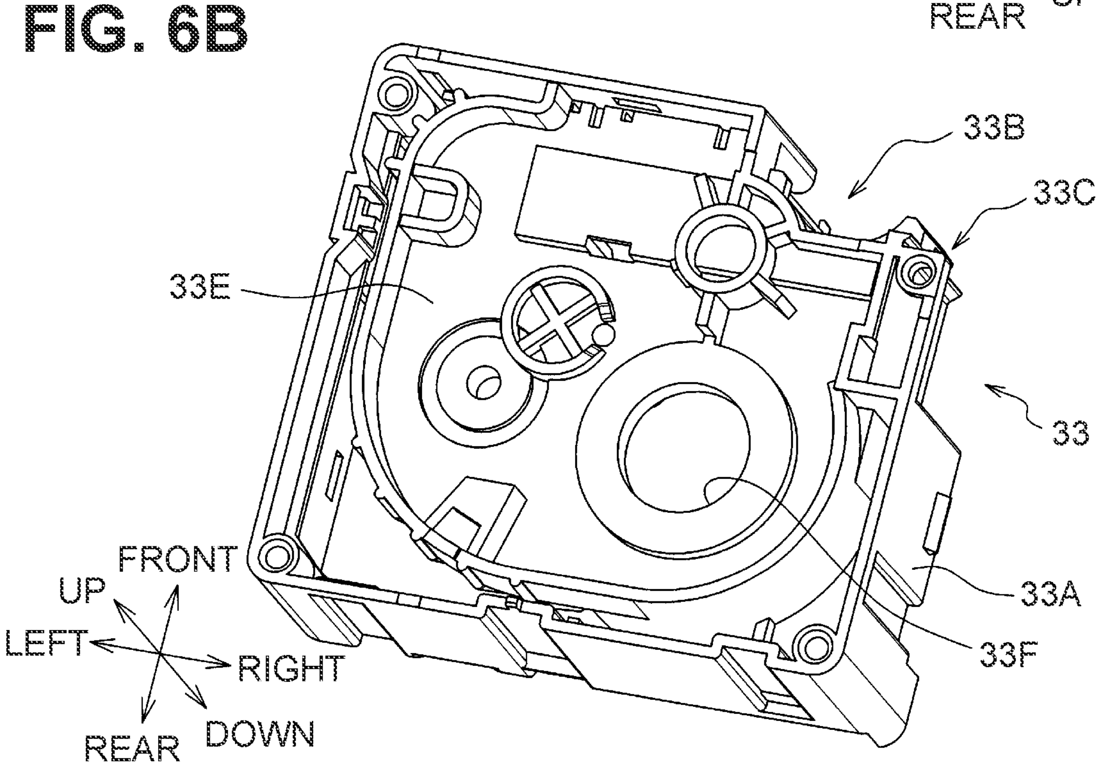
FIG. 6B is a schematic perspective view of the second frame portion of the printing cassette of FIG. 2A.

As shown in FIGS. 3 and 6B, the second frame portion 33 has a second side wall 33A, a head opening 33B, a discharge port 33C, a second guide 33D, a first isolation wall 33E, and a hole 33F. The second side wall 33A constitutes a side surface parallel to the up-down direction of the printing cassette 10.

The head opening 33B is a portion in which a part of the second side wall 33A is cut off. The head opening 33B is a space in which the print head 102 is disposed inside by inserting the print head 102 from below in a state where the print cassette 10 is attached to the printing apparatus main body 100. The head opening 33B opens below the printing cassette 10.

The second guide 33D is a portion around which the printing tape 11A that has passed through the first guide 32C is wound. Similar to the first guide 32C, the second guide 33D has a plurality of plate-shaped ribs arranged so as to be isolated along the circumferential direction of the ink ribbon roll 14. The plurality of ribs protrude in the radial direction of the ink ribbon roll 14, and the amount of protrusion (that is, a plate width) decreases toward the lower side.

The first isolation wall 33E isolates the gear body 19A of the input gear 19 and the input spool 16 in the up-down direction, and supports the input gear 19 from the side of the input spool 16 (that is, from below). The first separation wall 33E is located between the gear body 19A of the input gear 19 and the input spool 16 (that is, the take-up roll 14B) in the up-down direction, and extends in the front-rear direction and the left-right direction.

The hole 33F is provided at the first isolation wall 33E and penetrates the first isolation wall 33E in the up-down direction. The hole 33F is disposed at a position overlapping the gear body 19A and the second gear shaft 32E of the input gear 19 in the up-down direction.

As shown in FIG. 5, the wall portion 1913 of the input gear 19 passes through the hole 33F and is inserted into the hollow portion of the input spool 16 (that is, the take-up roll 14B). Further, in the up-down direction, the gear body 19A of the input gear 19 is disposed between the first isolation wall 33F and the gear facing surface 32H of the second isolation wall 32G.

A distal end (that is, the lower end) of the second gear shaft 32E is arranged at a position closer to the gear facing surface 32H than the distal end (that is, the lower end) 19D of the wall portion 19B that is farthest from the gear facing surface 32H in the up-down direction. That is, the distal end of the second gear shaft 32E is located above the wall portion 19B, and the second gear shaft 32E does not penetrate the wall portion 19B.

The second gear shaft 32E has a concave portion 32I in which a distal end thereof is concave toward the gear facing surface 32H. In a state where the printing cassette 10 is attached to the printing apparatus main body 100, an end portion 105A of the drive shaft 105 is inserted into the concave portion 32I.

A diameter of the second gear shaft 32E is less than an inner diameter of the wall portion 19B (that is, the diameter of the hollow portion). Further, a diameter of the end portion 105A of the drive shaft 105 is less than a diameter of the other portion of the drive shaft 105.

As shown in FIG. 5, the case 35 has a first surface 35A that defines an upper outline of the case 35 and a second surface 35B that defines a lower outline of the case 35 at a position isolated from the first surface 35A in the up-down direction.

Each of the first surface 35A and the second surface 35B intersects in the up-down direction. Further, the input spool 16 and the input gear 19 are disposed between the first surface 35A and the second surface 35B in the up-down direction.

In the up-down direction, a first distance D1 between an end portion (that is, the upper end) of the input gear 19 on the side of the first surface 35A and the first surface 35A is more than a second distance D2 between an end portion (that is, the lower end) of the input gear 19 on the side of the second surface 35B and the second surface 35B. Further, in the up-down direction, the first distance D1 is more than a second distance D3 between the end portion (that is, the lower end) of the ink ribbon 14A (that is, the take-up roll 14B) that is wound around the input spool 16 on the side of the second surface 35B and the second surface 35B.

(Conveyance of Tape)

Figure 8:
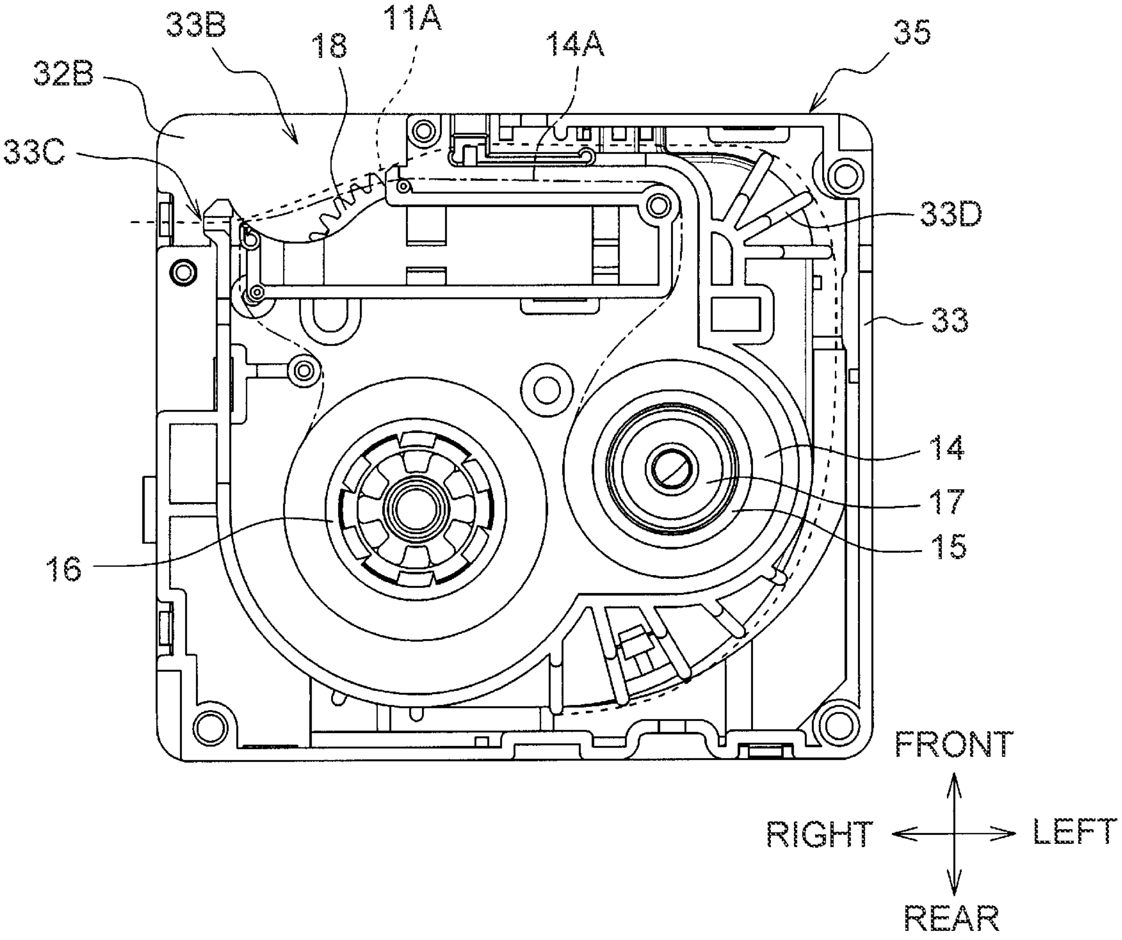
FIG. 8 is a schematic diagram illustrating a path of a printing tape and an ink ribbon in the printing cassette of FIG. 2A.

As shown in FIG. 8, the printing tape 11A and the ink ribbon 14A are straddled in the left-right direction at the head opening 33B. The printing tape 11A that has been printed is discharged to the outside of the printing apparatus 1 from the discharge port 33C. A part of the output gear 18 is located in the head opening 33B. Further, the cover portion 32B is exposed in the head opening 33B.

As shown in FIGS. 9A, 9B, 9C, and 9D, the first guide 32C and the second guide 33D have a passage through which the printing tape 11A constituting the printing tape roll 11 is conveyed from the first frame portion 32 to the second frame portion 33.

Figure 9A:
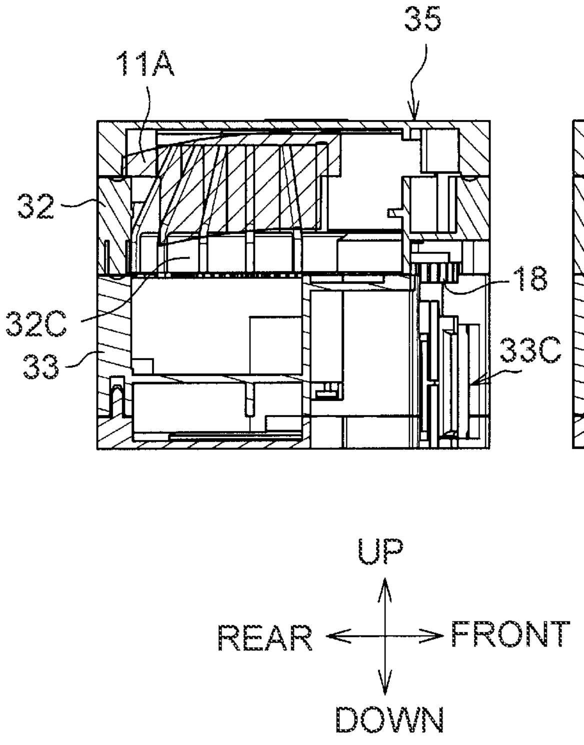
FIG. 9A is a schematic cross-sectional view taken along the line IXA-IXA of FIG. 2C.
Figure 9B:
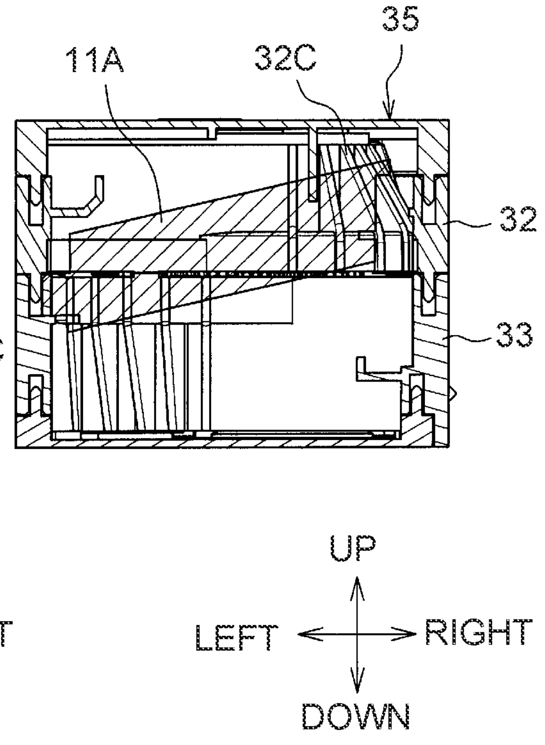
FIG. 9B is a schematic cross-sectional view taken along the line IXB-IXB of FIG. 2C.

Specifically, as shown in FIG. 9A, the printing tape 11A drawn out from the printing tape roll 11 is conveyed downward and rearward within the first frame portion 32 while the printing tape 11A abuts on the first guide 32C in a spiral manner from the radial outside of the printing tape roll 11. As shown in FIG. 9B, the printing tape 11A is conveyed toward the lower left while the printing tape 11A straddles the connecting portion between the first frame portion 32 and the second frame portion 33 in the up-down direction.

Figure 9C:
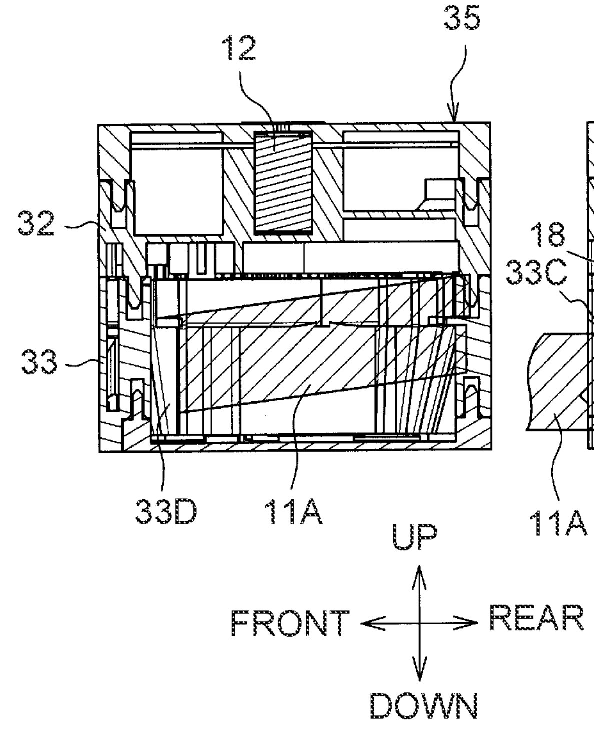
FIG. 9C is a schematic cross-sectional view taken along, the line IXC-IXC of FIG. 2C.
Figure 9D:
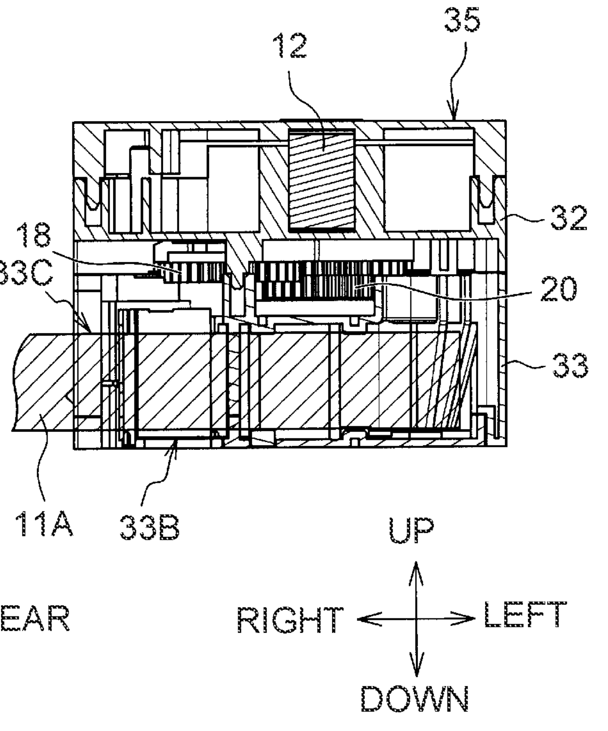
FIG. 9D is a schematic cross-sectional view taken along the line IXD-IXD of FIG. 2C.

As shown in FIG. 9C, the printing tape 11A that has reached the second frame portion 33 is conveyed downward and forward while the printing tape 11A abuts on the second guide 33D from the outside in the radial direction. As shown in FIG. 9D, the printing tape 11A that has reached the lower end of the printing cassette 10 passes through the head opening 33B and is discharged from the discharge port 33C.

(Tape Conveyance and Printing by the Printing Apparatus Main Body)

The print head 102 prints on the printing tape 11A held by the printing cassette 10. The print head 102 is disposed at a position where the print head 102 overlaps with the printing tape 11A and the ink ribbon 14A in the head opening 33B in the front-rear direction in a state where the printing cassette 10 is attached to the printing apparatus main body 100.

The printing tape 11A conveyed to the head opening 33B by the platen roller 103 is pressed against the print head 102 via the ink ribbon 14A in which the heat generating element generates heat. Accordingly, a part of the ink disposed on the surface of the ink ribbon 14A is transferred to the printing tape 11A, whereby characters, symbols and the like are printed on the printing tape 11A.

The platen roller 103 conveys the printing tape 11A from the inside of the printing cassette 10 to the outside. The platen roller 103 abuts on the printing tape 11A at the head opening 33B, and presses the printing tape 11A against the printing head 102.

Figure 10:
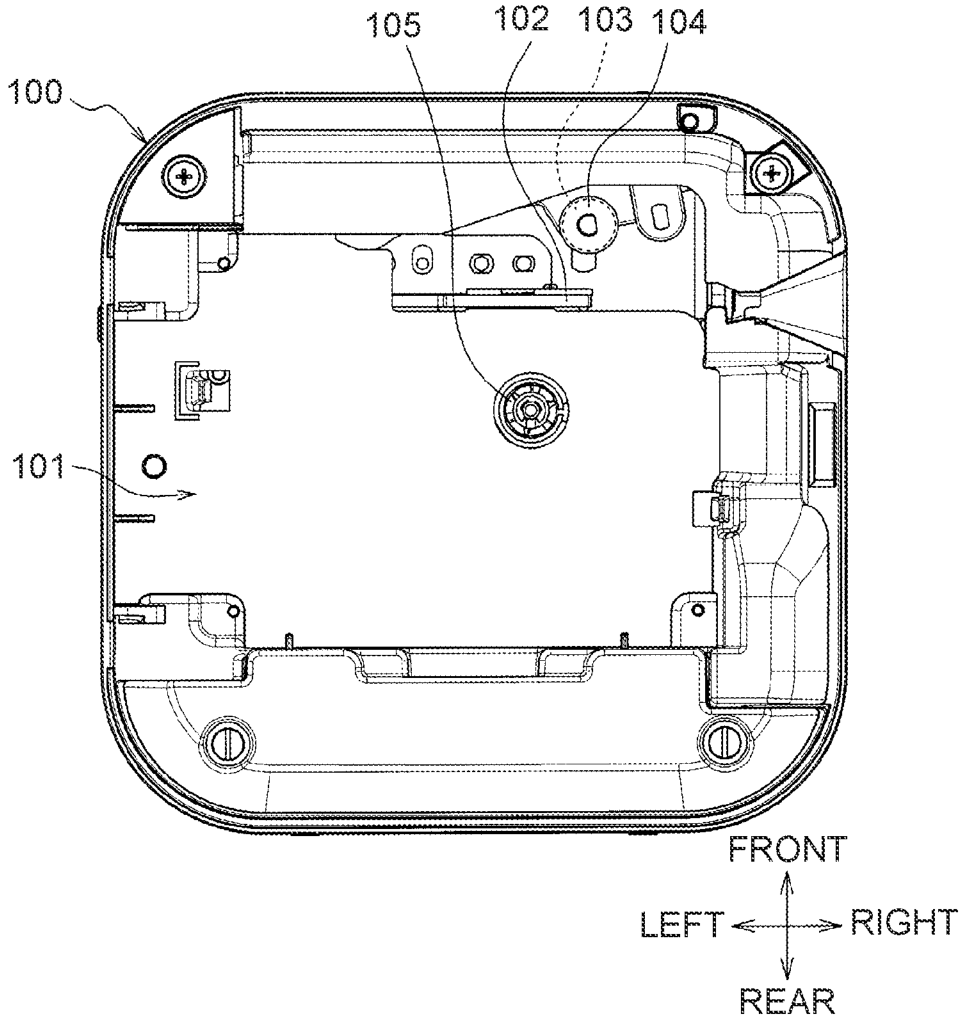
FIG. 10 is a schematic plan view of the printing apparatus main body in the printing apparatus of FIG. 1A.

The platen gear 104 is connected to the platen roller 103 and engages with the output gear 18. The platen roller 103 and the platen gear 104 can swing between a position shown in FIG. 10 isolated from the printing cassette 10 and a position shown in FIG. 11 where the platen gear 104 engages with the output gear 18.

The drive shaft 105 is inserted into the input spool 16 and the input gear 19, and engages with the spool-side spline tooth 16B and the gear-side spline tooth 19C to rotate the input spool 16 and the input gear 19.

Figure 11:
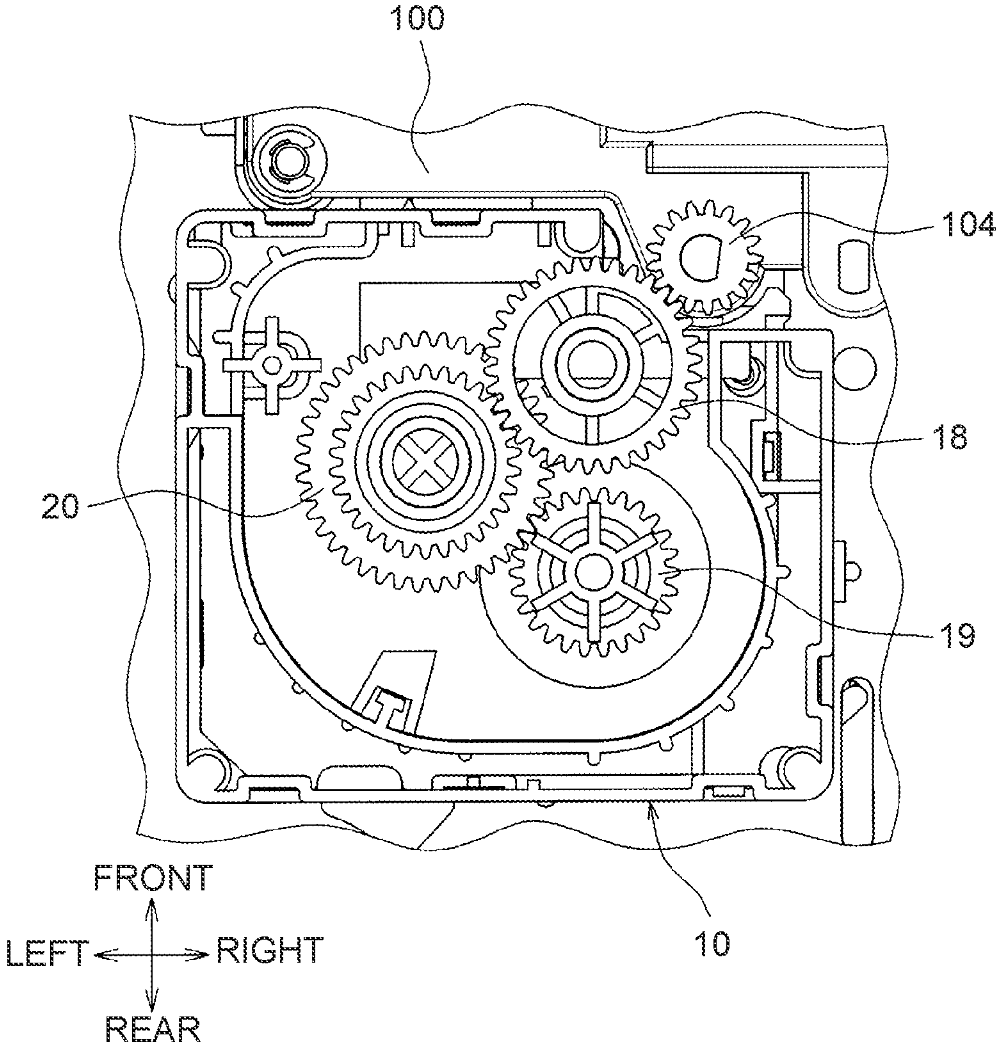
FIG. 11 is a schematic view showing an engagement state between the output gear and the platen gear in the printing apparatus of FIG. 1A.

As shown in FIG. 11, in a state where the printing cassette 10 is attached to the printing apparatus main body 100, the drive shaft 105 engages with the input gear 19 and the platen gear 104 engages with the output gear 18. Specifically, the drive shaft 105 is inserted into the input spool 16 and the input gear 19 of the printing cassette 10. After that, the platen roller 103 and the platen gear 104 are swung toward the head opening 33B of the printing cassette 10.

The output gear 18 is rotated by rotating the input gear 19 by the drive shaft 105 in a state where the printing cassette 10 is attached, the platen gear 104 is rotated by the rotation of the output gear 18, and the platen roller 103 is rotated by the rotation of the platen gear 104.

[1.2 Effect]

According to the embodiment described in detail above, the following effects can be obtained.

(1a) Driving force may be transmitted from one drive shaft 105 to both of the input spool 16 and the input gear 19 at different positions in the axial direction of the rotational axis L6 of the input spool 16 (that is, the insertion direction of the drive shaft 105). Thus, the driving force may be input to both of the input spool 16 and the input gear 19 while suppressing the increase in the size of the printing cassette 10 in the direction orthogonal to the insertion direction of the drive shaft 105 (that is, the front-rear direction and the left-right direction).

(1b) By using the spool-side spline tooth 16B as the engaging portion for transmitting the driving force from the drive shaft 105 to the input spool 16, the input spool 16 may be rotated while the drive shaft 105 is passed through the input spool 16. Accordingly, the space for arranging the drive system may be reduced.

(1c) By using the gear-side spline tooth 19C as the engaging portion for transmitting the driving force from the drive shaft 105 to the input gear 19, the input spool 16 and the input gear 19 may be arranged so as to be overlapped with each other in the radial direction of the drive shaft 105. Accordingly, the space for arranging the drive system may be reduced.

(1d) The first isolation wall 33E may appropriately maintain the positional relationship between the input gear 19 and the input spool 16 in the up-down direction. Accordingly, the efficiency of transmitting the driving force to the spool-side spline tooth 16B and the gear-side spline tooth 19C may be improved.

(1e) Since the second gear shaft 32E has the concave portion 321, positional deviation between the drive shaft 105 and the printing cassette 10 in the radial direction of the drive shaft 105 may be suppressed. Accordingly, the efficiency of transmitting the driving force to the spool-side spline tooth 16B and the gear-side spline tooth 19C may be improved.

(1f) The first distance D1 is more than each of the second distance D2 and the third distance D3. Thus, if the printing cassette 10 is dropped, damage to the input gear 19 may be suppressed.

2. Other Embodiments

Although the embodiments of the present disclosure have been described above, it is needless to say that the present disclosure is not limited to the above-described embodiments and various configurations may be adopted.

(2a) In the printing apparatus of the above embodiment, the first engaging portion and the second engaging portion may be other than the spline tooth (for example, external tooth arranged on an outer peripheral surface of the spool). Further, the drive shaft may not necessarily have to be inserted into the input spool in a state where the printing cassette is attached to the printing apparatus main body.

The second engaging portion of the input gear may be disposed at a position that does not overlap with the hollow portion of the input spool (that is, the take up roll) in the up-down direction. Further, the wall portion is not limited to a cylindrical shape. For example, the wall portion may be composed of a plurality of plate members arranged apart from each other in the circumferential direction of the input gear. Further, the input gear may not necessarily have to have a wall portion, and may be a single gear that directly engages with the drive shaft.

Figure 12A:
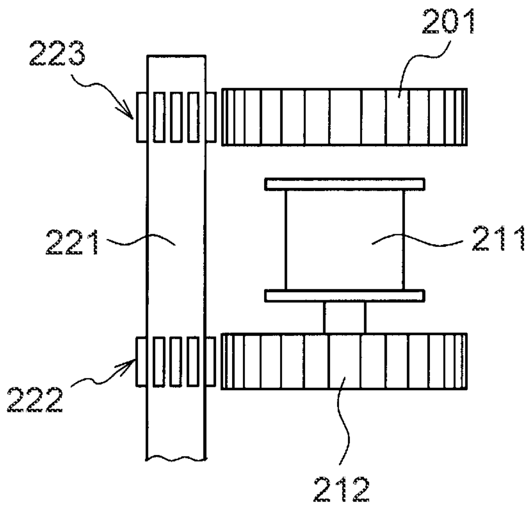
FIGS. 12A, 12B, 12C and 12D are schematic views showing the positional relationship between the drive shaft and the engaging portion of the printing apparatus in the embodiment different from that of FIG. 1A, respectively.

For example, as shown in FIG. 12A, when the printing cassette is attached to the printing apparatus main body, the drive shaft 221 may be inserted into a different position in the direction orthogonal to the axial direction of the drive shaft 221 (that is, the radial direction) with respect to the input spool 211, the first engaging portion 212, and the input gear 201.

In FIG. 12A, the first engaging portion 212 is a single gear connected to the input spool 211 and engages with the first tooth 222 provided on the outer peripheral surface of the drive shaft 221. Further, the input gear 201 directly engages with the second tooth 223 provided on the outer peripheral surface of the drive shaft 221.

Figure 12B:
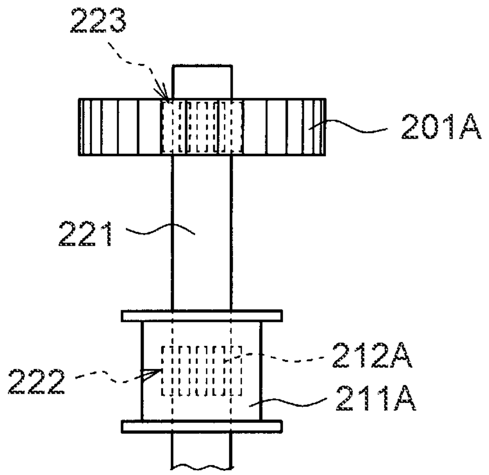

For example, as shown in FIG. 12B, a single gear having a through hole through which the drive shaft 221 is inserted in the central portion thereof may be used as the input gear 201A. The input gear 201A engages with the second tooth 223 of the drive shaft 221 by a spline tooth provided on the inner peripheral surface defining the through hole.

The input spool 211A and the first engaging portion 212A of FIG. 12B correspond to the input spool 16 and the spool-side spline tooth 16B of the first embodiment, respectively. The first engaging portion 212A engages with the first tooth 222 of the drive shaft 221.

Figure 12C:
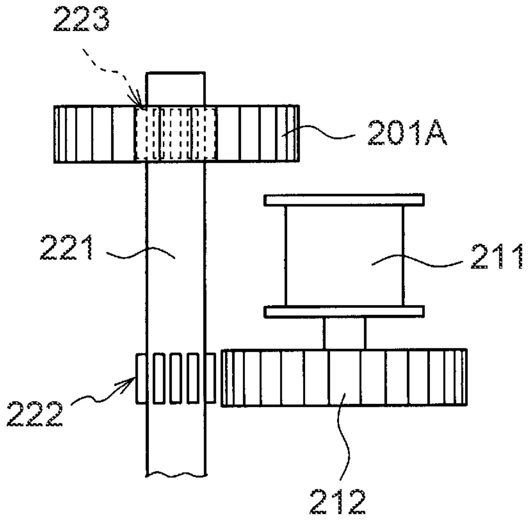

For example, as shown in FIG. 12C, an input spool 211 through which the drive shaft 221 is not inserted and an input gear 201A through which the drive shaft 221 is inserted may be used. The input gear 201A of FIG. 12C is the same as that of FIG. 12B, and the input spool 211 and the first engaging portion 212 of FIG. 12C are the same as those of FIG. 12A.

Figure 12D:
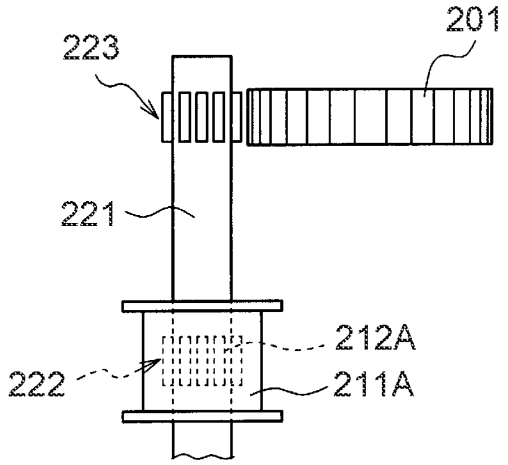

For example, as shown in FIG. 12D, an input spool 211A through which the drive shall 221 is inserted and an input gear 201 through which the drive shall 221 is not inserted may be used. The input gear 201 of FIG. 12D is the same as that of FIG. 12A, and the input spool 211A and the first engaging portion 212A of FIG. 12D are the same as those of FIG. 12B.

(2b) The printing apparatus of the above embodiment is not limited to a printing apparatus that prints using an ink ribbon. The printing apparatus may use a strip-shaped thermal paper as a substitute for the printing tape in the first embodiment, and may use a laminated tape (that is, a protective tape) as a substitute for the ink ribbon.

Further, the printing apparatus may use a stencil tape in which a printing pattern is perforated by a thermal head as the printing tape, and a strip-shaped interleaving paper that protects and supports the stencil tape. In this case, at the head opening, the printing tape may be superimposed on the interleaving paper at a position closer to the printing head than the interleaving paper (that is, as an upper layer) or at a position farther to the print head than the interleaving paper (that is, as a lower layer).

The printing apparatus may further use a laminated tape in addition to the printing tape and the ink ribbon. That is, the printing cassette may be provided with a third supply spool for supplying the laminated tape.

(2c) In the printing cassette of the above embodiment, the input spool may be used as a supply spool for winding a printing tape, an ink ribbon or another tape, and supplying these tapes to the head opening.

(2d) The printing cassette of the above embodiment may have two or more idle gears. Further, the idle gear may not necessarily have to be a step gear, and may be a single gear. Further, the printing cassette may not necessarily have to have an idle gear, and the output gear may be directly engaged with the input gear.

(2e) The functions of one component in the above embodiment may be dispersed as a plurality of components, or the functions of the plurality of components may be integrated into one component. Further, a part of the configuration of the above embodiment may be omitted. Further, at least a part of the configuration of the above embodiment may be added or substituted with respect to the other configurations of the above embodiment. It should be noted that all aspects included in the technical idea specified from the wording described in the claims are embodiments of the present disclosure.

What is claimed is:

1. A printing cassette, comprising:
- a case;
- a supply spool located in the case;
- an ink ribbon wound around the supply spool;
- an input spool rotatable about a rotation axis extending in a first direction, the input spool is configured to take up the ink ribbon from the supply spool, the input spool having a first hollow defined by an inner peripheral surface of the input spool, the input spool including first spline teeth located at the inner peripheral surface of the input spool; and
- an input gear rotatable about the rotation axis, the input gear including gear teeth, the input gear having a second hollow defined by an inner peripheral surface of the input gear, the input gear including second spline teeth located at the inner peripheral surface of the input gear, wherein the second spline teeth are in the first hollow, and wherein the input gear is located in the case.

2. The printing cassette according to claim 1, wherein the case includes:
- a first isolation wall that is located between a part of the input gear and the input spool in the first direction and extends in a direction intersecting the first direction, the first isolation wall having a hole penetrating the isolation wall in the first direction, wherein the input gear is inserted into the input spool through the hole.

3. The printing cassette according to claim 2, wherein the case further includes a second isolation wall that is located at an opposite side of the input gear with respect to the input spool in the first direction, wherein the second isolation wall includes a protrusion inserted into the input gear.

4. The printing cassette according to claim 3, wherein the protrusion includes a concave portion at the distal end thereof.

5. The printing cassette according to claim 2, further comprises:

a tape spool located at an opposite side of the first isolation wall with respect to the input spool; and a tape wound around the tape spool.

6. The printing cassette according to claim 1, wherein the case includes:

a first surface defining an outline of the case and intersecting the first direction; and a second surface defining the outline of the case at a separated position from the first surface in the first direction and intersecting the first direction, wherein the input spool and the input gear are disposed between the first surface and the second surface in the first direction, wherein a first distance between the first surface and an end portion of the input gear at a side of the first surface is more than a second distance between the second surface and an end portion of the input gear at a side of the second surface, and wherein the first distance is more than a third distance between the second surface and an end portion of the ink ribbon at a side of the second surface.

7. The printing cassette according to claim 1, wherein the first spline teeth protrude from the inner peripheral surface of the input spool.

8. The printing cassette according to claim 1, wherein the second spline teeth protrude from the inner peripheral surface of the input gear.

9. The printing cassette according to claim 1 further comprising:

an idle gear, wherein the gear teeth are away from the second spline teeth in the first direction, wherein the idle gear engages with the gear teeth.

10. The printing cassette according to claim 9 further comprising:

an output gear engaging with the idle gear.

11. The printing cassette according to claim 10, wherein the case is configured such that the output gear is exposed from the case.

12. The printing cassette according to claim 3 further comprising:

an idle gear engaging with the gear teeth; and an output gear engaging with the idle gear, wherein the idle gear and the output gear are located between the first isolation wall and the second isolation wall in the first direction.

13. The printing cassette according to claim 5, wherein the case further includes a first lid portion having an opening, and wherein the input spool is located between the lid portion and the first isolation wall in the first direction, the input spool is exposed from the opening.

14. The printing cassette according to claim 13, wherein the case further includes a second lid portion, wherein the tape roll is located between the second lid portion and the first isolation wall.

15. The printing cassette according to claim 1, wherein the second spline teeth are radially inside a pitch circle of the gear teeth.

16. The printing cassette according to claim 1, wherein the second hollow is in the first hollow.

17. A printing cassette comprising:

a case;

a supply spool located in the case;

an ink ribbon wound around the supply spool;

an input spool rotatable about a rotation axis extending in a first direction, the input spool is configured to take up the ink ribbon from the supply spool, the input spool having a first hollow defined by an inner peripheral surface of the input spool, the input spool including first spline teeth located at the inner peripheral surface of the input spool; and an input gear rotatable about the rotation axis, the input gear including gear teeth and a wall portion, the wall portion having a second hollow, the input gear including second spline teeth located at the second hollow, wherein the wall portion is nested in the first hollow.

18. The printing cassette according to claim 17, wherein the second spline teeth are in the first hollow.

* * * * *